United States Patent Office 3,228,852
Patented Jan. 11, 1966

3,228,852
NUCLEAR REACTOR
John Arthur Godfrey Holmes, Cuddington, near Norwich, and Harry Hayes, Culcheth, near Warrington, England, assignors to United Kingdom Atomic Energy Authority, London, England
Filed May 27, 1963, Ser. No. 283,456
Claims priority, application Great Britain, June 1, 1962, 21,342/62
2 Claims. (Cl. 176—58)

This invention relates to nuclear reactors.

There are known nuclear reactors, hereinafter referred to as pebble-bed reactors, wherein a plurality of fuel elements in the form of pebbles, which can be packed with intercommunicating interstitial spaces and are therefore conveniently spherical, are contained loosely in a reactor vessel whilst coolant fluid is passed through them. One form of pebble-bed reactor is described and claimed in our British patent specification No. 821,607. Yet another form of pebble-bed reactor was described by Robinson and Benerati at a meeting on Gas-Cooled Power Reactors (TID Report No. 7564). In this latter reactor fuel pebbles are contained in seven vertical channel from which heat is removed by a downward flow of helium through the channels; the vertical channels discharge fuel pebbles to a common conical reactor base which delivers the pebbles to a single central fuel outlet. It is found that this construction of pebble bed reactor requires the use of a conical reactor base of large included angle if the outlet channels are to have a reasonable vertical height and the resulting nuclear core to have a compact, substantially cylindrical shape. A base of this sort has the disadvantage that discharge of fuel pebbles through the outlet does not proceed evenly and stagnation of pebbles in the channels occurs.

The present invention provides a pebble-bed nuclear reactor having a core structure which defines by surfaces of refractory material a plurality of separate reactor vessels to receive beds of fuel elements, each reactor vessel having a fuel inlet, a fuel outlet, and a conical base converging towards the outlet with an included angle not greater than 90°. Preferably the refractory material is graphite.

Figure 1:
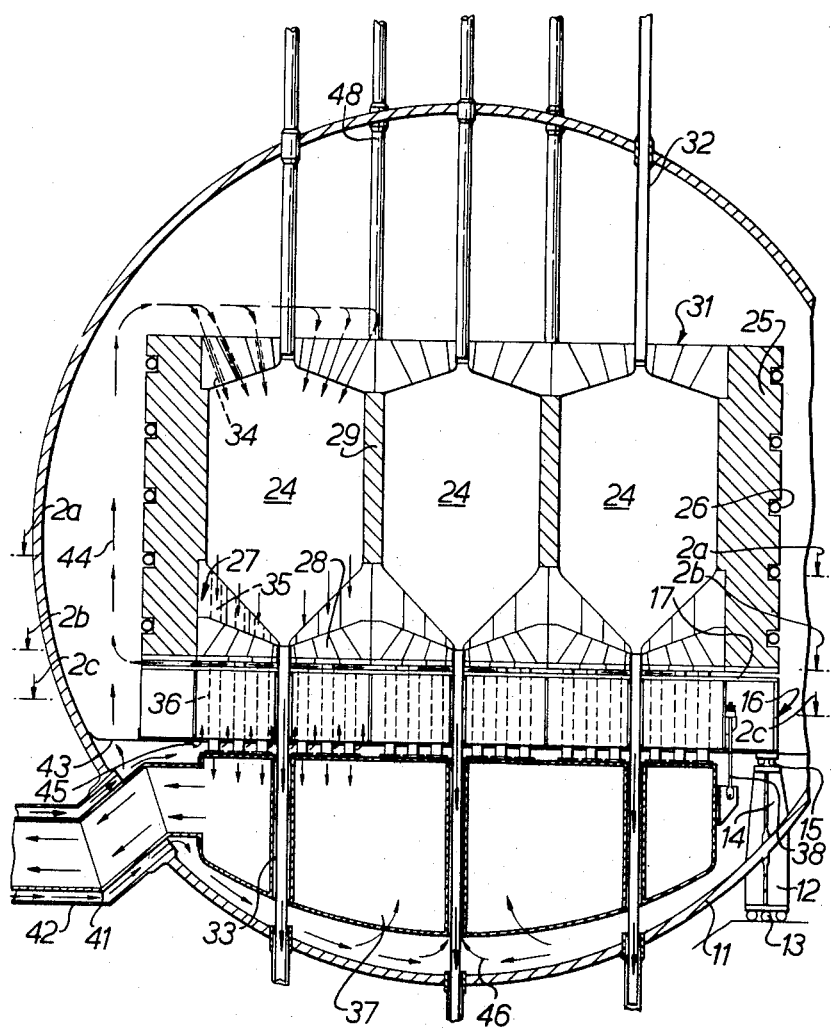
Figure 2:
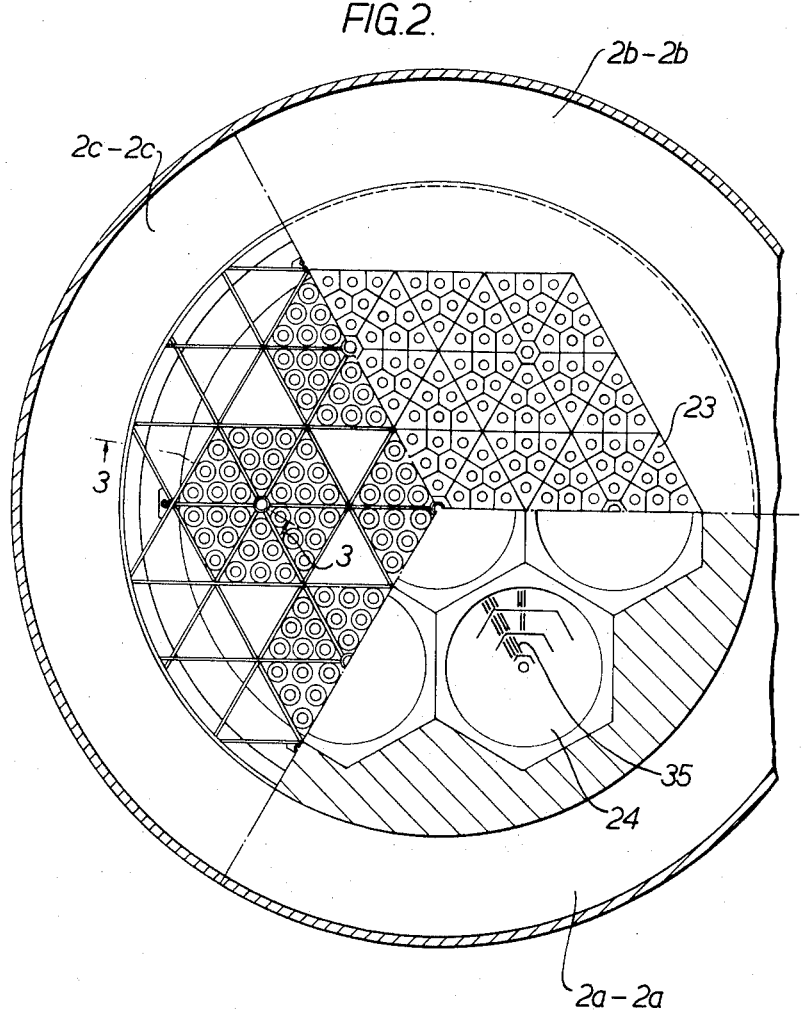
Figure 3:
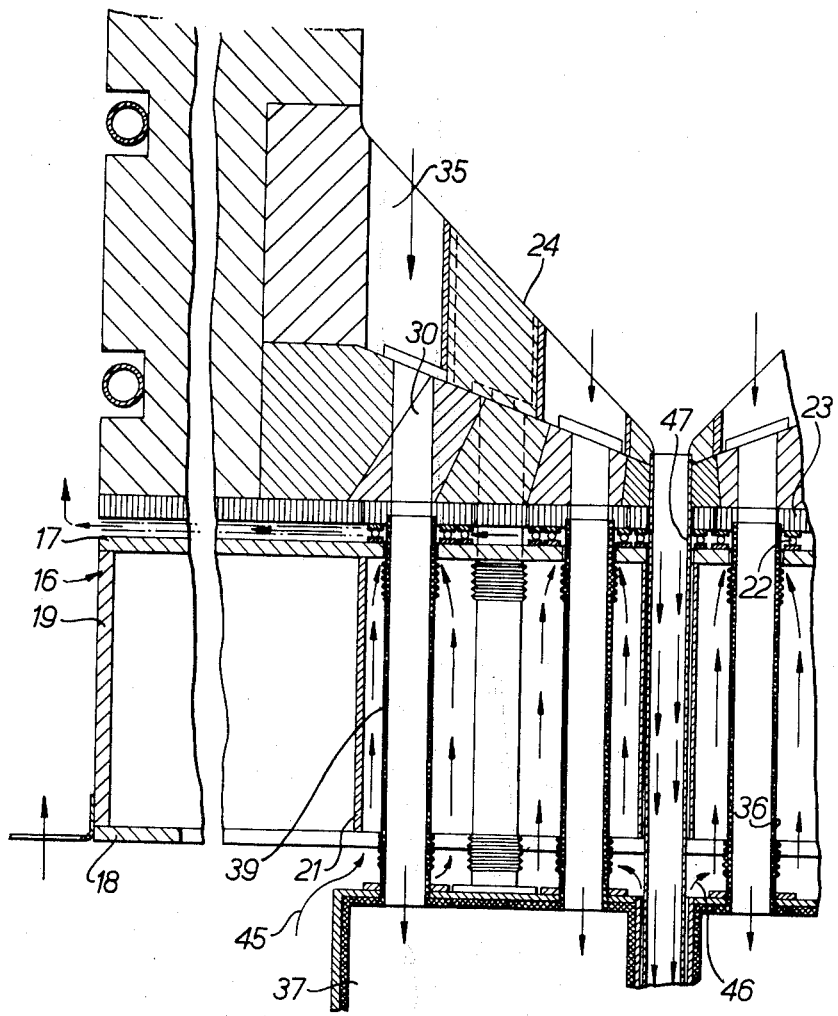

One construction of pebble-bed nuclear reactor embodying the invention will now be described by way of example with reference to the accompanying drawings in which:

FIGURE 1 shows a vertical section through the reactor,
FIGURE 2 shows sectional views on lines 2a—2a, 2b—2b and 2c—2c of FIGURE 1, and
FIGURE 3 shows an enlarged view of part of the reactor being a sectional view on line 3—3 of FIGURE 2.

The pebble-bed reactor now to be described is contained in a pressure-tight steel sphere 11 which is supported on legs 12 carried by rollers 13. Within the sphere pedestals 14 and rollers 15 support a steel diagrid 16 of box-like structure having a top plate 17, a bottom plate 18, skirts 19 and spacing plates 21 (FIGURE 3). The diagrid top plate 17 carries thrust bearings 22 which support load-bearing stainless steel insulating blocks 23 of openwork construction. These insulating blocks are of layered honeycomb structure in which each layer comprises spaced strips of stainless steel standing upright on edge.

The insulating blocks 23 support a graphite core structure which defines seven reactor vessels 24 to receive beds of fuel elements in the form of spherical balls, the vessels being arranged so that six vessels are grouped with equal spacing in a circle around a central vessel. The core structure is built of graphite bricks so that it is wholly of refractory material. It is constituted by a circular outer wall 25 strengthened by restraining hoops 26, core bottoms 27 each constituted as an inverted arch with graphite bricks 28 of keystone shape and defining conical bases for the reactor vessels 24, core partitions 29 also of graphite which separate the reactor vessels, and core lids 31 of graphite which close the reactor vessels. The lower surfaces of the core lids 31 are shaped to provide conical tops to the reactor vessels, and an aperture at the centre of each lid 31 is provided with a fuel charge tube 32 by which fuel pebbles can be introduced into the reactor vessels. The conical reactor bases defined by the core bottoms 27 have an included angle of 90° and each delivers to a central aperture which communicates with a fuel discharge tube 33 by which fuel pebbles can be discharged from the reactor vessels. In operation of the reactor, a bed of fuel pebbles is present in each reactor vessel and pebbles are continuously charged into and discharged from these beds. In order to avoid stagnation of the pebbles in these beds it has been found that the conical bases to the reactor vessels must have an included angle (that is the angle subtended by the convergent surfaces at the discharge tube aperture) 90° or less. The subdivision of the core volume into seven reactor vessels 24 enables each vessel to have an included angle of 90° or less whilst allowing the vessels to have vertical sides of reasonable dimensions.

The fuel pebbles are each composed of a nodule of uranium carbide coated with pyrolitic graphite and embedded in a graphite matrix, the fuel being uniformly dispersed throughout the nodule.

The core lids 31 have coolant inlet passages 34 through which gaseous coolant can pass into the reactor vessel and the core bases have coolant outlet passages 35 through which the gaseous coolant is withdrawn. The passages 35 are slotlike in cross-section to prevent fuel pebbles passing through them and communicate with coolant outlet conduits 36 (FIGURE 3) which extend downwardly through the diagrid and open into a hot box 37 suspended below the diagrid by hangers 38 and appropriate brackets. These outlet conduits 36 are provided internally with dimpled stainless steel lagging 39 and have their upper ends butted into the insulating blocks 23, apertures through the insulating blocks providing communication between the conduits 36 and passages 30 in the beds which in turn communicate with the outlet passages 35. The lagging 39 within the conduits 36 is continued within the hot box 37. When the reactor is in operation an upward thrust on the hot box (for reasons hereinafter described) relieves the tension on the hangers 38 and is transmitted by the outlet conduits 36 to the insulating blocks 23. Thus, the conduits are under compression while the reactor is in operation. Insulated passages through the hot box permit the fuel discharge tubes 33 to pass through the hot box and a coolant outlet conduit 41 from the hot box passes out of the reactor sphere 11 coaxially with a coolant inlet conduit 42.

In operation, the reactor sphere is pressurised with gaseous coolant at its inlet temperature. The main coolant stream (arrows 44) passes into the top of the reactor vessels through passages 34, downwards through fuel pebble beds within the vessels and through the coolant outlet passages 35 and conduits 36 into the hot box 37, and out of the hot box through the outlet conduit 41. The coolant passing through the hot box has, of course, been heated in its passage through the fuel pebble beds. Accordingly provision has to be made to cool the diagrid and the fuel discharge tubes 33. For this purpose apertured plates 43 are provided between the diagrid and the sphere which form a partition between upper and lower partitions of the sphere. Although the main coolant stream passes upwards through these plates, a secondary coolant stream (arrows 45) is diverted through the diagrid to cool it; this secondary stream flows outwards underneath the insulating blocks 23 to rejoin the main coolant stream. A third coolant stream (arrows 46) flows upwardly around the fuel discharge tubes 33 where they pass through the hot box to cool the discharge tubes at this point; this third coolant stream also flows through the diagrid to rejoin the main coolant stream.

Finally provision is made to retain discharged fuel pebbles in the discharge tubes 33 for a period sufficient to allow the pebbles to dissipate heat due to decaying radioactivity. For this purpose coolant at inlet temperature and pressure is admitted into the discharge tubes 33 through bleed holes 47 (FIGURE 3) just below the core structure. Whereas the main stream of coolant leaving the hot box passes through a heat exchanger (not shown) before it reaches the inlet of a circulator (not shown) which returns it to the sphere, the coolant bled into the discharge tubes 33 is led directly to the circulator inlet so that flow through the tubes 33 in the direction towards the low pressure circulator inlet is promoted.

The coolant pressures in the system may be sumarmarised overall with reference to the pressure of the coolant in the inlet conduit 42 (inlet pressure) and the pressure of the coolant in the outlet conduit 41 (outlet pressure). The sphere interior is filled with coolant at inlet pressure which acts below the hot box as well as above the core structure; accordingly there is no resultant pressure force on the core structure taken together with the hot box due to coolant pressures within the sphere. The hot box and the coolant outlet conduits 36 are filled with coolant at outlet pressure. There is, accordingly, an upward pressure force on the hot box equivalent to the product of the total cross-sectional area of the conduits 36 and the difference between the inlet and outlet pressures. This upward pressure force is assumed in the present example to be greater than the weight of the hot box so that the conduits 36 are in compression and apply a net upward force to the insulating blocks 23. Such upward force partly counteracts the downward force on the insulating blocks due to the weight of the core structure and due to the pressure differences on the core structure, namely the product of the total cross-sectional area of the conduits 36 and the difference between the inlet and outlet pressures.

This downward force is spread over the insulating blocks 23 by the inverted arch formation of the vessel bases; in particular, downward forces transmitted through the vessel walls, which may be greater than elsewhere for example owing to friction between the fuel pebbles and the walls, are spread over the insulating blocks by the inverted arches. As a result of the counteraction of the upward and downward forces the diagrid is only required to take a load due to the weight of the core structure and of the hot box.

The reactor is controlled by control rods (not shown) of refractory neutron absorbing material such as boron carbide which are driven by conventional mechanism through standpipes 48 into unlined channels in the graphite core partitions 29. The control rod channels are unlined so as to reduce the amount of fixed neutron absorbing material within the reactor core. The provision of control rod channels in the partitions between the reactor vessels places them in regions of high neutron flux and therefore enables the control rods to be very effective in controlling the reactivity of the reactor.

A typical specification for the reactor described above by way of example is as follows:

| | | |
|---|---|---|
| Reactor heat output | mw | 1000 |
| Coolant gas inlet temperature | °C | 300 |
| Coolant gas outlet temperature | °C | 750 |
| Maximum fuel element surface temperature | °C | 1000 |
| Maximum fuel element temperature | °C | 1400 |

We claim:

1. In a pebble-bed nuclear reactor having a core structure of refractory material, a plurality of separate reactor vessels defined by the core structure, beds of pebble fuel elements within the reactor vessels, a fuel inlet to each vessel, and a fuel outlet from each vessel, the provision of a conical base to each vessel which converges towards the outlet with an included angle not greater than 90°, a diagrid to support the core structure, means to circulate fluid reactor coolant downwardly through the vessel, coolant outlets from the reactor vessel, outlet conduits communicating with the coolant outlets and depending from the core through the diagrid, and a vessel defining a coolant outlet plenum which is suspended from the core structure by means of the outlet conduits and into which the outlet conduits open.

2. A pebble-bed nuclear reactor as claimed in claim 1 wherein thermal insulation is interposed between the core structure and the diagrid, said thermal insulation comprising a load-bearing layer of honeycomb structure.

References Cited by the Examiner

UNITED STATES PATENTS

| | | | |
|---|---|---|---|
| 3,034,689 | 5/1962 | Stoughton et al. | 176—59 |
| 3,046,212 | 7/1962 | Anderson | 204—193.28 |
| 3,058,897 | 10/1962 | Slack | 204—193.28 |
| 3,100,187 | 8/1963 | Fraas | 204—193.2-.37 |

OTHER REFERENCES

TID–7564, 196–204, December 1958.

LEON D. ROSDOL, *Primary Examiner.*

REUBEN EPSTEIN, CARL D. QUARFORTH,
*Examiners.*

M. R. DINNIN, *Assistant Examiner.*